Sept. 10, 1935. E. L. KULICK 2,013,920
GOVERNOR CONTROL FOR SHOCK ABSORBERS
Filed May 9, 1934
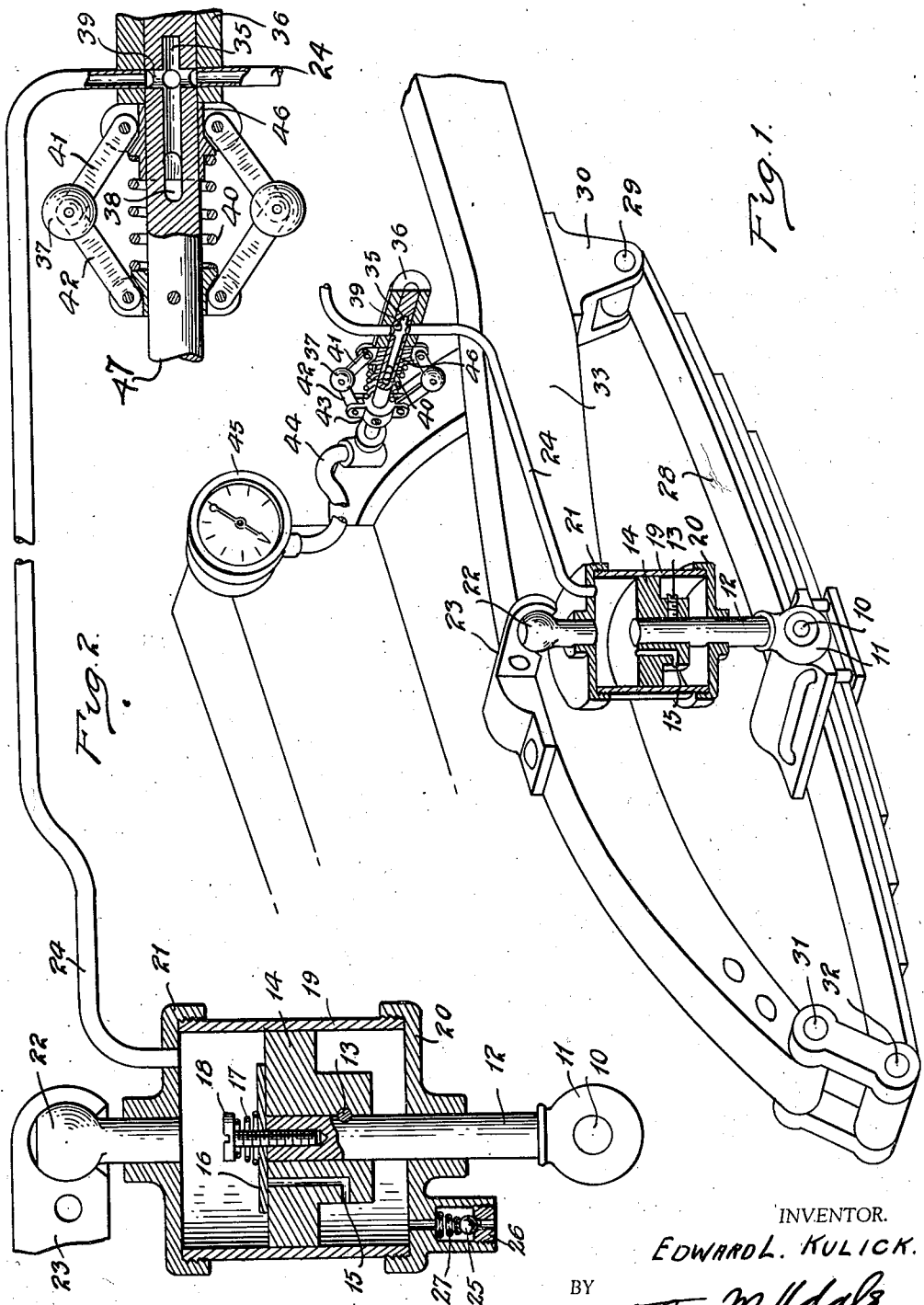
INVENTOR.
EDWARD L. KULICK.
BY
ATTORNEY.

Patented Sept. 10, 1935

2,013,920

UNITED STATES PATENT OFFICE 2,013,920

GOVERNOR CONTROL FOR SHOCK ABSORBERS

Edward L. Kulick, Detroit, Mich., assignor to Mallory Research Company, Toledo, Ohio, a corporation of Delaware, in trust Application May 9, 1934, Serial No. 724,713

11 Claims. (Cl. 188—88)

The object of this invention is to provide a pneumatic shock absorber which at high speeds will be more effective than at low speeds. A shock absorber which is satisfactorily adjusted for boulevard driving is not stiff enough for driving at high speeds across country.

Fig. 1 shows the preferred form of the device.

Fig. 2 shows an alternative construction drawn to a somewhat larger scale.

In the figures:—

10 is a pin pivot connected to an ordinary spring 28. 11 is an eye bolt surrounding said pin, having a piston rod 12 extending therefrom. 14 is a piston secured to the piston rod by a set screw 13 or other suitable means and reciprocating in a cylinder 19. The upper head 21 of the cylinder 19 has an upward extension connected by a ball and socket joint 22 to a bracket 23 which is rigidly secured to the frame 33, the bracket being shown in the drawing with one side removed in order to illustrate the construction more clearly. The lower head 20 of the cylinder provides a guide for the piston rod 12. A restricted by-pass 15 through the piston 14 connects the opposite ends of the cylinder. The frame 33 carries the usual spring supports 29, 30, 31 and 32. Leading out of the upper end of the closed cylinder 19 is a pipe 24 leading to a vent 38.

See Fig. 2. The pipe 24 communicates with a passage 39, which communicates with the hole 35, drilled into a valve 47. This valve 47 is moved by the governor mechanism 40, 41, 42 and 37; 40 being the spring, 37 being the governor weights, and 41 and 42 being the governor links. The governor links are rotatably anchored to the valve cylinder 36, in which the valve 47 reciprocates. This is a well-known form of governor control mechanism, and any other form of governor mechanism may be substituted therefor. The valve 47 has a telescopic connection with a member which is driven from the speedometer drive 44, which controls the speedometer 45.

In Fig. 2, the pneumatic shock absorber is somewhat modified as compared with Figure 1. The governor control mechanism remains as before, but there is added to the lower end of the cylinder 19 a check valve mechanism comprising ball valve 25, a spring 27, an adjustable valve seat 26, and also a check valve to the piston controlling the restricted by-pass 15, comprising a disc valve 16, a spring 17, an adjustable screw 18. At low speeds, with this construction, the lower chamber of the cylinder 19 fills with air which is discharged under resistance into the upper chamber as the unevenness of the road causes the piston 14 to move up and down in the cylinder. The upper chamber is vented more or less freely to the atmosphere through the tube 24 and vent 38. As the speed of travel increases, the governor closes the vent 38 and thus has the effect of greatly increasing shock absorber resistance and making the car more rigid. During impact, as the cylinder 19 moves downwardly, the valve 25 opens and permits air to enter the compression space beneath the piston 14. This figure also shows a set screw 13, locking the piston 14 to the piston rod 12. This construction is not the preferred form, but is an alternative.

The principle of operation of both forms is that at high speeds the shock absorber becomes more effective as the vent, which permits the shock absorber to act freely, is restricted by a centrifugal governor which responds to the speed of the car. The air is compressed in the upper end of the cylinder by the road impacts, and it is this end which is connected to the vent, which in turn is controlled by the centrifugal governor, so that as the speed increases, the vent is progressively closed. In the drawing, the pipe 24 is shown as extending beyond the valve cylinder 36. This extension may be connected to another shock absorber on the other side of the vehicle.

What I claim is:—

1. A pneumatic shock absorber for vehicles comprising a cylinder closed at both ends, a piston reciprocating therein, a restricted passage serving as a by-pass leading from one end of the cylinder to the other, a vehicle speed responsive device, a pipe leading from one end of said cylinder, a vent in said pipe controlled by said device for the purpose described.

2. A pneumatic shock absorber comprising a cylinder closed at both ends, a piston reciprocating therein, a non-return valve located in said cylinder at one end thereof arranged to permit air to enter the cylinder, a restricted by-pass connecting both ends of the cylinder together, a check valve therein adapted to transfer air from the end having the non-return valve to the other end, a pipe leading from said other end, a vent in said pipe, a valve controlling said vent, vehicle speed responsive means controlling said valve for the purpose described.

3. A pneumatic shock absorber comprising a cylinder closed at both ends, a piston therein, a piston rod extending from one end of said cylinder, a check valve located in said end of the cylinder and permitting air to enter the cylinder, a restricted passage connecting both ends of said cylinder together, a pipe leading from the other end of said cylinder, a vehicle speed responsive device, a valve controlled by said device, said valve being located in said pipe.

4. A pneumatic shock absorber comprising a cylinder closed at both ends, a piston therein, a piston rod extending from one end of said cylinder, a check valve located in said end of the cylinder and permitting air to enter the cylinder, a restricted passage connecting both ends of said cylinder together, a check valve therein adapted to transfer air from said end of the cylinder to the other end, a pipe leading from the said other end, a vent in said pipe, a valve controlling said vent, vehicle speed responsive means controlling said valve for the purpose described.

5. A pneumatic shock absorber for vehicles having a frame supported on springs comprising a cylinder connected to the frame and a piston connected to the springs and adapted to reciprocate in said cylinder and to compress air therein when the springs are compressed, a pipe leading from the compression space in said cylinder, a vent in said pipe, vehicle speed responsive means controlling said valve for the purpose described.

6. A pneumatic shock absorber for a vehicle having a frame supported by springs comprising a cylinder and a piston, means responsive to the relative movement of the frame and spring to cause the piston to compress air in said cylinder, a pipe leading from said compressed air space in said cylinder, a vent in said cylinder, vehicle speed responsive means to progressively close said vent at high speeds.

7. A pneumatic shock absorber for a vehicle having a frame supported by springs comprising a piston, a cylinder therefore closed at both ends, a restricted passage connecting both ends together, said piston being responsive to impact to compress air in one end of said cylinder and responsive to recoil to compress air in the other end, a pipe leading from the first end, a vent therein, vehicle speed responsive means for progressively closing said vent at high vehicular speeds.

8. A pneumatic shock absorber for a vehicle having a frame supported by springs comprising a piston, a cylinder therefor closed at both ends, a restricted passage connecting both ends together, said piston being responsive to impact to compress air in one end of said cylinder and responsive to recoil to compress air in the other end, a pipe leading from the first end, a vent therein, vehicle responsive means for progressively closing said vent at high vehicular speeds, a non-return valve located in the said other end of said cylinder permitting air to enter the cylinder during the compression of the spring.

9. A pneumatic shock absorber for a vehicle having a frame supported by springs comprising a piston, a cylinder therefor closed at both ends, a restricted passage connecting both ends together, said piston being responsive to impact to compress air in one end of said cylinder and responsive to recoil to compress air in the other end, a pipe leading from the first end, a vent therein, vehicle responsive means for progressively closing said vent at high vehicular speeds, a non-return valve for said restricted passage preventing air from escaping from the first mentioned end of the cylinder during impact.

10. A pneumatic shock absorber for a vehicle having a frame supported by springs comprising a piston, a cylinder therefor closed at both ends, a restricted passage connecting both ends together, said piston being responsive to impact to compress air in one end of said cylinder and responsive to recoil to compress air in the other end, a pipe leading from the first end, a vent therein, vehicle responsive means for progressively closing said vent at high vehicular speeds, a non-return valve located in the said other end of said cylinder permitting air to enter the cylinder during the compression of the spring, a non-return valve for said restricted passage preventing air from escaping from the first mentioned end of the cylinder during impact.

11. A fluid shock absorber for vehicles comprising a cylinder closed at both ends, a piston reciprocating therein, a restricted passage serving as a by-pass leading from one end of the cylinder to the other, a centrifugal governor responsive to vehicle speed, a pipe leading from one end of the space in said cylinder in which said piston reciprocates, a vent in said pipe controlled by said governor for the purpose described.

EDWARD L. KULICK.